United States Patent
Caccia et al.

(10) Patent No.: US 12,323,511 B2
(45) Date of Patent: Jun. 3, 2025

(54) DEVICE AND METHOD FOR GENERATING RANDOM BIT SEQUENCES

(71) Applicants: Massimo Luigi Maria Caccia, Milan (IT); Lorenza Paolucci, Milan (IT)

(72) Inventors: Massimo Luigi Maria Caccia, Milan (IT); Luca Malinverno, Varese (IT); Lorenza Paolucci, Milan (IT)

(73) Assignee: RANDOM POWER SRL IN FORMA ABBREVIATA RAP! S.R.L., Milan (IT)

( * ) Notice: Subject to any disclaimer, the term of this patent is extended or adjusted under 35 U.S.C. 154(b) by 551 days.

(21) Appl. No.: 17/281,422

(22) PCT Filed: Oct. 1, 2019

(86) PCT No.: PCT/IB2019/058340
§ 371 (c)(1),
(2) Date: Mar. 30, 2021

(87) PCT Pub. No.: WO2020/070641
PCT Pub. Date: Apr. 9, 2020

(65) Prior Publication Data
US 2021/0344488 A1     Nov. 4, 2021

(30) Foreign Application Priority Data
Oct. 1, 2018   (IT) .................. 102018000009064

(51) Int. Cl.
*H04L 9/08*     (2006.01)
*G06F 7/58*     (2006.01)

(52) U.S. Cl.
CPC ............ *H04L 9/0852* (2013.01); *G06F 7/588* (2013.01)

(58) Field of Classification Search
CPC ................................ H04L 9/0852; G06F 7/588
(Continued)

(56) References Cited

U.S. PATENT DOCUMENTS

| 2004/0139132 | A1  | 7/2004 | Lutkenhaus et al. |
| 2007/0156798 | A1* | 7/2007 | Saito ................ G06F 7/588 |
|              |     |        | 708/250 |

(Continued)

FOREIGN PATENT DOCUMENTS

| CN | 102176199 A | 9/2011 |
| CN | 103713879 B | 2/2017 |

(Continued)

OTHER PUBLICATIONS

Bisadi, Z., Acerbi, F., Fontana, G., Zorzi, N., Piemonte, C., Pucker, G., & Pavesi, L. (2018). Compact quantum random number generator with silicon nanocrystals light emitting device coupled to a silicon photomultiplier. Frontiers in Physics, 6, 9. (Year: 2018).*

(Continued)

*Primary Examiner* — Linglan Edwards
*Assistant Examiner* — Phuc Pham
(74) *Attorney, Agent, or Firm* — Armstrong Teasdale LLP

(57) ABSTRACT

A device for generating random bit sequences is provided. The device includes at least one Silicon Photo-Multiplier sensor configured to generate a sequence of endogenous random current pulses as a result of an impact ionization driven self-amplification of thermally generated charge carriers to which the at least one Silicon Photo-Multiplier sensor is subject, and a data processing unit configured to receive the sequence of endogenous random current pulses and to determine a random bit sequence to be provided to an end user on the basis of the sequence of endogenous random current pulses received from the at least one Silicon Photo-Multiplier sensor.

18 Claims, 5 Drawing Sheets

(58) Field of Classification Search
USPC .......................................................... 380/278
See application file for complete search history.

(56) References Cited

U.S. PATENT DOCUMENTS

2017/0315046 A1* 11/2017 Du ..................... G01N 21/6428
2017/0322324 A1* 11/2017 Fu ........................... G01T 1/244
2021/0025997 A1*  1/2021 Rosenzweig ......... G01S 7/4817

FOREIGN PATENT DOCUMENTS

| JP | 2000276329 A | 10/2000 |
| JP | 2001075782 A | 3/2001 |
| JP | 2017049194 A | 3/2017 |

OTHER PUBLICATIONS

International Search Report and Written Opinion for International Patent Application No. PCT/IB2019/058340, mailed Jan. 7, 2020, 13 Pages.

Bisadi et al., Compact Quantum Random Number Generator with Silicon Nanocrystals Light Emitting Device Coupled to a Silicon Photomultiplier, Frontiers in Physics, Feb. 14, 2018, vol. 6, Article 9, Frontiers Media, 8 pages.

Saveliev, The recent development and study of silicon photomultiplier, Nuclear Instruments and Methods in Physics Research Section A: Accelerators, Spectrometers, Detectors and Associated Equipment, Dec. 11, 2004, pp. 528-532, vol. 535, Issues 1-2, Elsevier B.V.

* cited by examiner

DEVICE AND METHOD FOR GENERATING RANDOM BIT SEQUENCES

CROSS-REFERENCE TO RELATED APPLICATIONS

This application is a National Stage Application of International Patent Application No. PCT/IB2019/058340, having an International Filing Date of Oct. 1, 2019, which claims the benefit of priority to Italian Patent Application No. 102018000009064, filed Oct. 1, 2018, the entire contents of which are hereby incorporated by reference herein.

FIELD OF THE INVENTION

The present invention relates to random number generation and, namely, a device and method for generating random bit sequences.

BACKGROUND OF THE INVENTION

As known, random number generation can be based on algorithms or on observables related to unpredictable natural phenomena. The former is software or firmware implemented, the latter require hardware systems for information gathering and methods to process it to extract series of stochastic numerical figures.

Algorithmic random generation certainly benefits from computing power and optimal programming to achieve extremely high data rates, well in excess of 10 Gb/s.

However, it suffers from fundamental and irreducible flaws:

- algorithms are deterministic. Therefore, the generated sequence is pseudo-random. It may have a period fitting most of the requirements but it will irreducibly be limited in its randomness properties;
- the generated sequence relies on a numerical seed to initialize the procedure. Therefore, accessing to it would imply accessing the full series of generated numerical figures.

Hardware random generation of numbers is based on natural phenomena, either described by classical physics or based on the quantum properties of Nature.

A classical description is deterministic.

Even if the complexity of the system or its chaotic nature can be presumed to provide the base for the practical unpredictability of the occurrences, the essence of the natural phenomenon is such that, once the initial conditions are known or reproduced in a controlled way, the dynamics of that system is well defined.

On the other hand, phenomena at quantum level are intrinsically stochastic and, as such, unpredictable. For this reason, they are the ideal base for True Random Number Generation (hereafter named TRNG).

Random number generators have applications in many fields, such as: computer security and cryptography; Internet of Things (IoT) devices, wherein some of them providing services that rely on secrecy to protect the end-user's privacy and avoid intrusion and hacking; numerical simulation of complex phenomena for science, industry (aerodynamics, thermodynamics and manufacturing), economics and sociology, wherein quality of random numerical figures has been shown to be essential for the reliability of simulation outcomes; optimisation in communications over crowded network; gambling and the development of on-line platforms.

Historically, the very first quantum random number generator was based on unstable radioactive nuclei, decaying emitting alpha, beta or gamma particles.

Emissions occur in an unpredictable way, and the number of decays in a pre-defined time window follows a Poisson distribution.

In other terms, the time lapse between two consecutive events follows an exponentially decaying probability density function, with a decay constant dependent on the isotope in use and on its radioactivity. Pulses are statistically independent and uncorrelated and random bit generation can be obtained in various methods.

Radioactive decays are yet today a very robust and reasonably simple way to obtain a random bit stream.

However, they suffer from obvious questions of health protection, safety and security, preventing their large-scale adoption.

Moreover, the particle detector features, notably its dead time and radiation damage, are limiting the obtainable throughput and undermine the stability.

Finally, even in dedicated sites, handling and storage of the radioactive sources make the system economically non-competitive.

As of today, most quantum random number generators rely on low light sources and detectors with single photon sensitivity, in a variety of set-ups and arrangements.

An exemplary illustration of a quantum random number generator, indicated with the reference number 100, is schematically reported in FIG. 1.

The generator 100 comprises a pulsed light source 101, a beam splitter 102, a first sensor D0 and a second sensor D1.

The pulsed light source 101 emits single photons across the beam splitter 102.

Presuming the pulsed light source 101 to emit single photons and the beam splitter 102 to be perfect, for every pulse the first sensor D0 and the second sensor D1 have an equal chance to receive the photon.

As long as their efficiency is the same, a 0-valued bit is generated when the first sensor D0 detects the photon and 1-valued bit is generated when the second sensor D1 does it.

The set-up of the quantum random generator of the FIG. 1 suffers from a series of weaknesses possibly affecting the quality of the extracted sequence of bits.

Indeed, standard light sources are emitting a random number of photons/pulses, typically following a Poisson distribution. Whether randomness can be a key value, in the set-up of FIG. 1 it represents a limiting factor. The need for reducing the probability of having more than one emitted photon to the $10^{-8}$ level requires a mean number of emitted photons/pulse not to exceed a few $10^{-4}$, affecting the achievable rate.

In addition, any imperfection in the beam splitter 102 impacts on the probability of producing 0 and 1. The same occurs unless the first sensor D0 and the second sensor D1 are identical in terms of photon detection probability and stability against temperature or operating voltage variations.

It should be noted that instrument and set-up weaknesses can be overcome with a proper engineering of the system and implementing methods for balancing the probability of producing an unpredictable series of bit values through post-processing algorithms.

Even so, a high quality of uniform random bits at Megabit per second (Mbps) rate can be achieved but at the price of increased system complexity and low efficiency in terms of useful bits per random event.

According to other solutions belonging to the state of the art, examples of set-up are relying on single photon sensitive detectors, possibly photon number resolving, to detect, time tag and record uncorrelated single photon emission by either an attenuated laser source or light emitting diodes (LED).

In particular, a quantum random number generator making use of the time of arrival of photons is based on a time stamped detection of single photons from a LED source, detected with a Photo-Multiplier Tube (PMT), mimicking the procedure implemented for random pulses by a radioactive source in a Geiger-Mueller or silicon based detector.

According to another solution of the state of the art, the Photo-Multiplier Tube has been replaced by a Single Photon Avalanche Photodiode (SPAD) and the overall set-up has been integrated on a single chip.

A variation of the same principle is based on counting pulses originated by a light source in a pre-defined time interval and relying on the Poissonian properties of the underlying distribution.

According to a solution belonging to the state of the art, random events correspond to the detection of light or its absence by a pulsed light source in single photon regime. Randomness extraction is based on clustering random events in blocks and applying an algorithm requiring resources increasing polynomially with the block length, implemented into a Field Programmable Gate Array (FPGA).

According to a further solution of the state of the art, an array of Single Photon Avalanche Photodiode (SPAD) is illuminated by a LED source emitting bursts of photons in a time interval perfectly tuned to have a 50% chance of each pixel of detecting a photon.

However, whether the design of this set-up is certainly of interest for its parallel implementation allowing in principle random bit generation at the Gbps rate, its main fragility sits in the request of "perfect" time tuning of the pulsing duration.

Another solution of the state of the art is instead based on the generation of two random bit strings according to the statistical properties of the Poissonian distribution in the number of detected photons per pulse by a Silicon Photomultiplier, namely an array of Single Photon Avalanche Photodiode (SPAD) with a common output.

However, once again, the principle is significant but the implementation is rather weak, requiring a perfect separation in the assignment of the number of detected photons/pulse, an extreme control of the system and a precise calibration prior and during the sequence generation.

In summary, all the solutions based on mimicking the detection of particles by a radioactive source using light pulses present:
- complexities in the set-up due to the characteristics of the light source and the request of a dual source-detector system;
- lack of robustness associated to the request of extreme stability against temperature and voltage variations;
- in some case, a low rate of extracted random bits per event.

SUMMARY OF THE INVENTION

It is the object of the present invention to devise and provide a device for generating random bit sequences which allows to solve, at least partially, the drawbacks mentioned above with reference to the prior art, having high reliability with a less complex set-up, guaranteeing high stability against temperature and voltage variations and high rate of extracted random bits per event.

Such an object is achieved by a device as described and claimed herein.

Preferred embodiments of said device are also described.

In addition, object of the present invention is a method for generating random bit sequences.

BRIEF DESCRIPTION OF THE FIGURES

Further features and advantages of the device and method according to the present invention will become apparent in the following description which shows preferred embodiments, given by way of indicative, non-limiting examples, with reference to the accompanying drawings, in which.

DETAILED DESCRIPTION

With reference to the aforesaid figures, according to the present invention, it will now be described a device 200 for generating random bit sequences, in the following also simply device.

Figure 3:
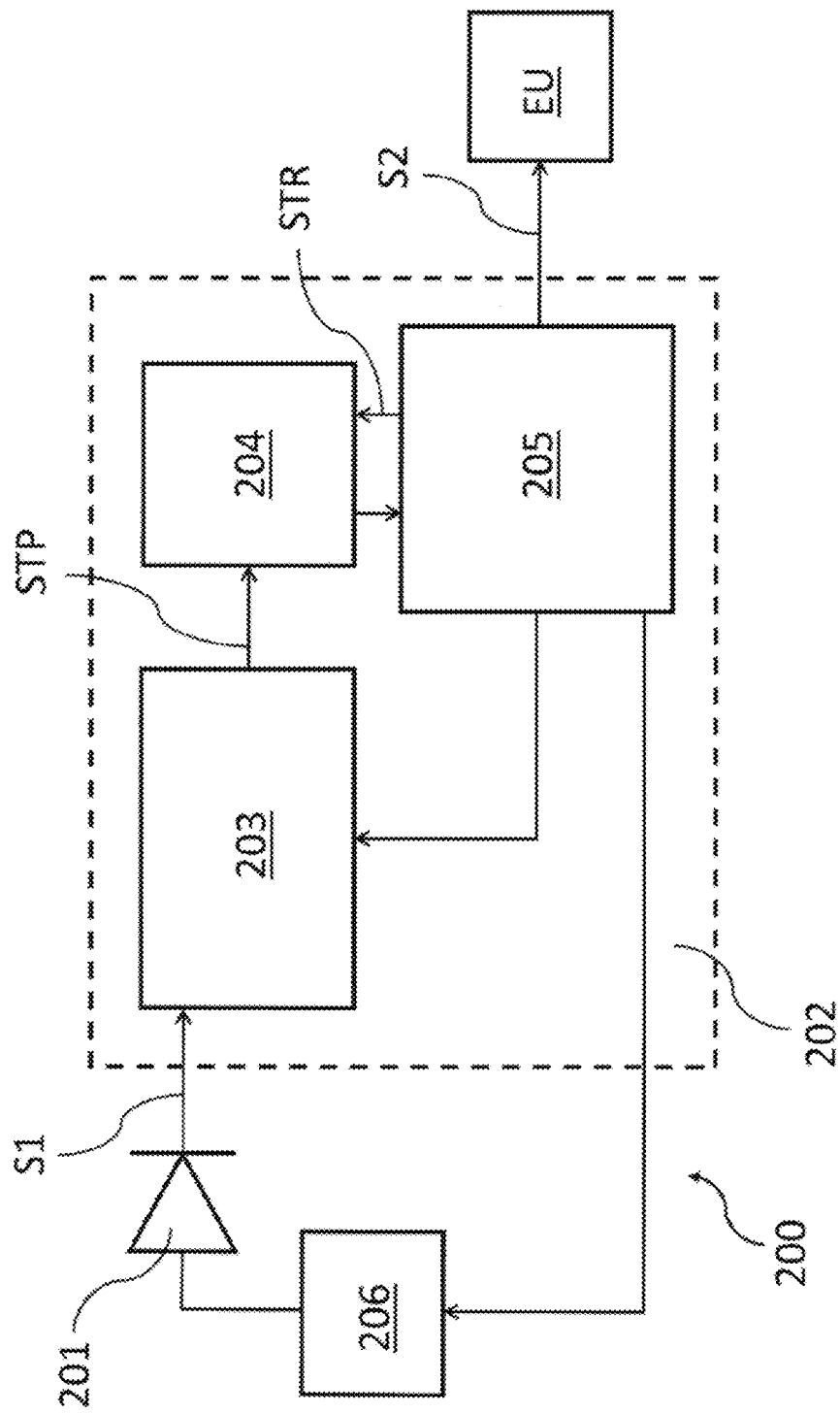
FIG. 3 schematically shows, by means of a block scheme, a device for generating random bit sequences according to an embodiment of the present invention.
Figure 4:
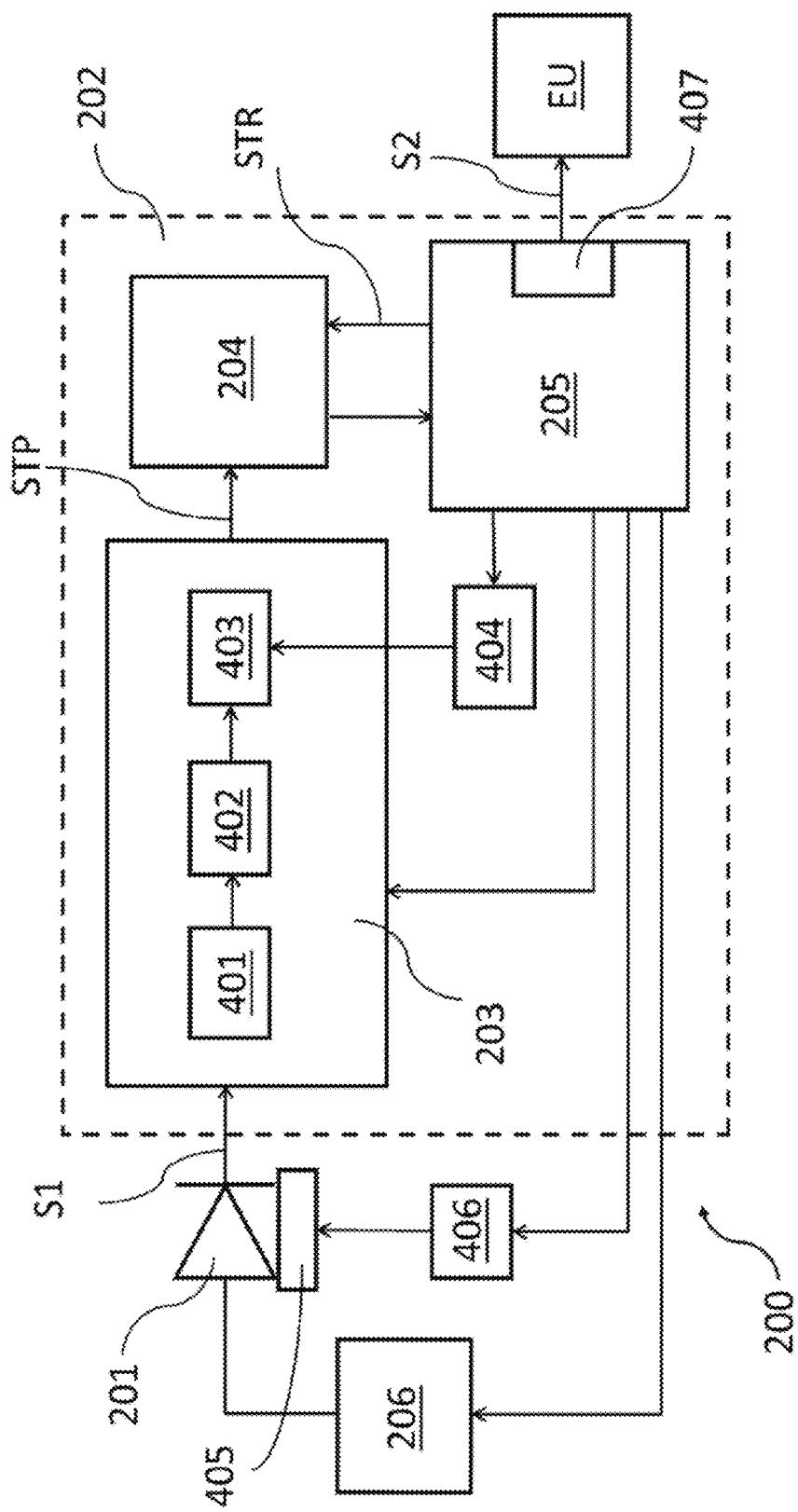
FIG. 4 schematically shows, by means of a block scheme, a device for generating random bit sequences according to an embodiment of the present invention, and FIG. 5 schematically shows, by means of a block diagram, a method for generating random bit sequences according to an embodiment of the present invention.

With reference in particular to the embodiments of FIGS. 3 and 4, the device 200 comprises at least one Silicon Photo-Multiplier sensor 201 configured to generate a sequence of endogenous random current pulses S1 as a result of an impact ionization driven self-amplification of thermally generated charge carriers to which the at least one Silicon Photo-Multiplier sensor 201 can be subject.

In this regard, it should observed that the Applicant noted the possibility to generate random bits by time tagging self-amplified pulses due to stochastically generated charge carriers in an array of p-n junctions (cells) operated beyond the breakdown voltage, namely devices known as Silicon Photomultipliers or Multi-Pixel Photon Counters.

This endogenous mechanism is expected to overcome the complexity and weakness of current random number generators based on quantum effects, relying on an exogenous source of pulses, either a radioactive or a photon source.

The quantum nature of the energy bands in semiconductor devices, the distribution of electrons on the energy levels according to the Fermi-Dirac statistics and the effects of high electric fields in microelectronics devices provide this mechanism.

Indeed, trap assisted thermally driven stochastic generation and recombination of free carriers is dominant in Silicon and other indirect semiconductor materials and it is the physical phenomenon at the base of the generation electrical current in the depletion region of p-n junctions.

Moreover, if the junction is operated in the avalanche regime, this mechanism is responsible for the occurrence of random pulses.

Irrespective from the mechanism, the Applicant noted that the key point is that the high density of potential carriers, the random occurrence of bringing them to the conduction band together with the stochastics probability of inducing an avalanche breakdown leads to a series of independent pulses that are expected to follow a Poissonian distribution, hence pulses are uncorrelated and their occurrence unpredictable.

Silicon Photomultipliers (SiPM) are currently offered on the market by a variety of producers, with densities up to 40 000 cells/mm2 [40], areas in excess of 6×6 mm2 and state-of-the-art interconnection techniques allowing to build up mosaic of equalized sensors in large areas.

In SiPM, the high electric fields in the junction volume leads to charge multiplication by impact ionization, with gains up to $10^6$ at biasing voltages not exceeding 70V.

In particular, SiPM essentially operate in a limited and quenched Geiger-Mueller regime, so that a single charge carrier can trigger a pulse with probabilities approaching 100% at a few volts above the breakdown voltage.

SiPM are commercialized as single photon sensitive and photon number resolving detectors, with the extreme sensitivity due to avalanches triggered by a single charge carrier released by a photon.

However, the avalanche development is blind to the mechanism generating the primary carrier: it may be a photon as well as any endogenous stochastic process related to temperature or the electric field map.

This is the principle at the base of the present invention, consisting in a SiPM packaged in full darkness, identifying the randomly initiated pulses, time tagging them and turning the sequence of pulses in a series of bits. The amplitude of the pulses, millions of electrons over a few tens of nanoseconds, make their identification robust and faultless; the avalanche time development, with a leading edge of the signal at the nanosecond level, makes time tagging extremely precise; the endogenous generation mechanism makes the process robust, also against temperature variations expected to change the rate without impairing randomness.

Pulse rates can achieve 1 MHz/mm2 at room temperature at a few volts over breakdown, offering the possibility to engineer very compact devices.

Figure 1:
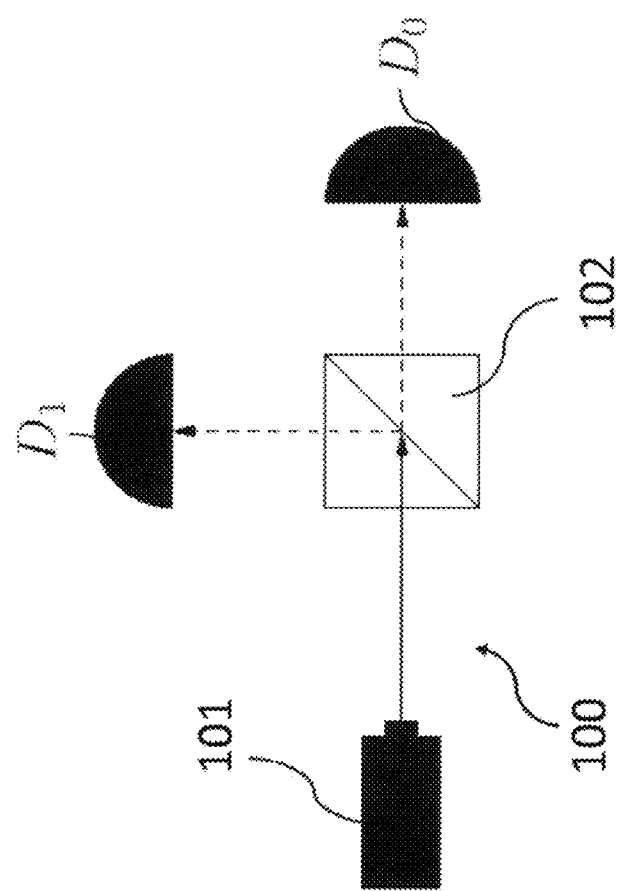
FIG. 1 schematically shows, by a block diagram, a random number generator belonging to the state of the art.
Figure 2:
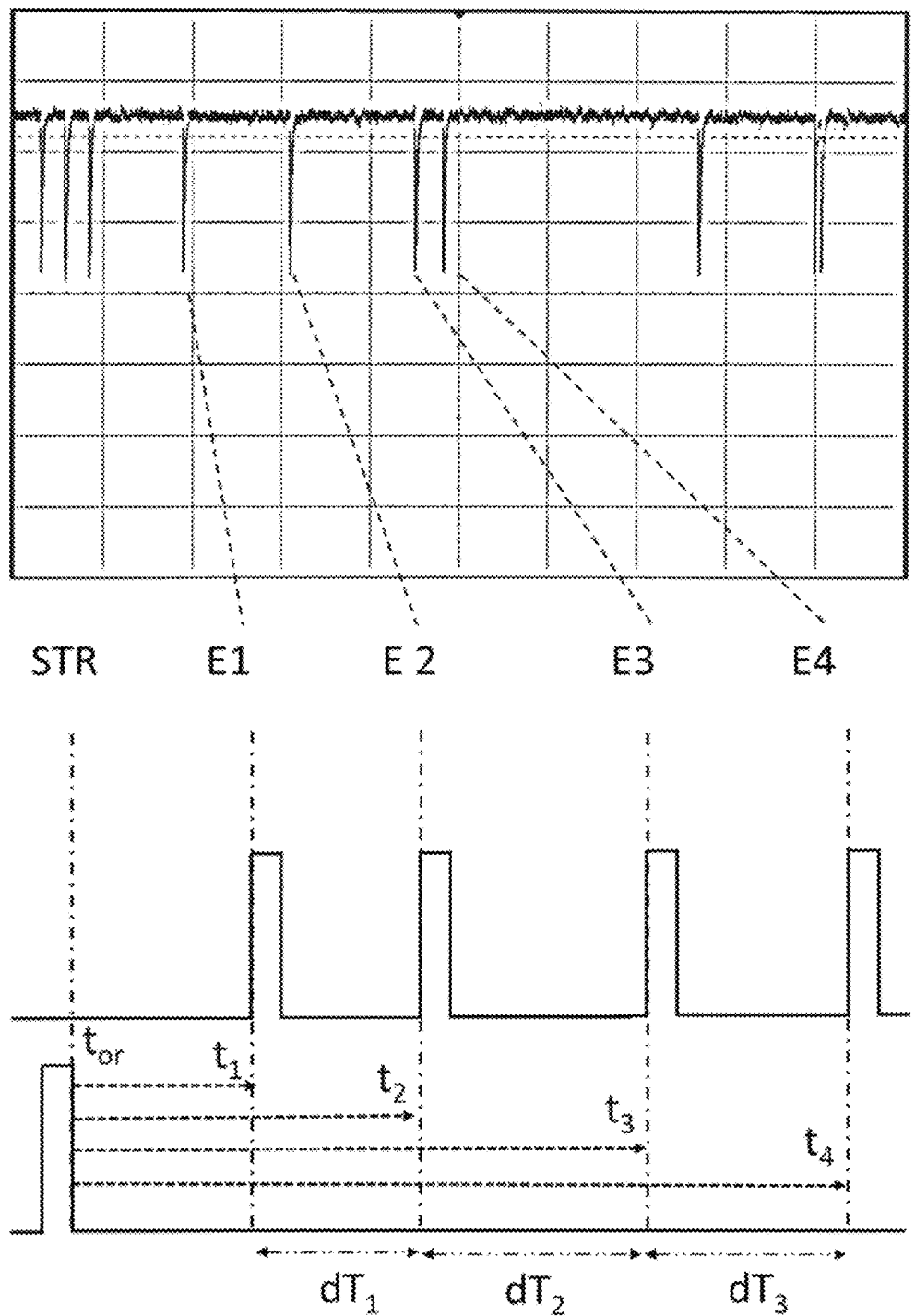
FIG. 2 schematically shows, by means of time diagrams, the trend over time of sequences of pulses which can be generated by a device for generating random bit sequences according to the present invention.

An exemplary illustration of pulses E1, E2, E3, E4 stochastically generated in a SiPM, such as the at least one Silicon Photo-Multiplier sensor 201 of the embodiments of FIGS. 3 and 4, is shown in FIG. 2.

Pulse identification is followed by the record of its time of arrival $t_i$, i=1, 2, 3, 4 . . . N, with respect to a reference timing origin $t_{or}$, as shown in the lower panel of the FIG. 2.

If pulses are uncorrelated and independent, in a pair of inter-arrival time intervals ($dT_i$, $dT_j$), where $dT_i=t_{i+1}-t_i$, there is an equal probability P that $dT_i$ is longer or shorter than $dT_j$, namely:

$$P(dT_i>dT_j)=P(dT_i<dT_j)=0.5.$$

According to this general property of sequences of events with no memory, bits are extracted according to the following procedure:

If $dT_i>dT_{i+2}$ the $i^{th}$ bit in the sequence is set to 1;
If $dT_i<dT_{i+2}$ the $i^{th}$ bit in the sequence is set to 0;
If $dT_i=dT_{i+2}$ no bit is produced.

In the exemplary illustration of FIG. 2:
$dT_1=t_2-t_1$;
$dT_2=t_3-t_2$;
$dT_3=t_4-t_3$;
$dT_1<dT_3$ the $1^{st}$ bit in the sequence is set to 0.

This procedure guarantees a bit extraction efficiency of up to 50%, possibly reduced by the number of equal time intervals.

Moreover, it is bias free (including the potential impact of time stamping by a continuous clock) and does not require processing algorithms reducing the effective bit rate.

The at least one Silicon at Silicon Photo-Multiplier sensor 201 is configured to gather entropy and, as already explained above, generate a sequence of endogenous random current pulses by impact ionization driven self-amplification (e.g. gain $10^6$) of thermally generated charge carriers, i.e. avalanches.

Turning to the embodiments of FIGS. 3 and 4, the device 200 further comprises a data processing unit 202 configured to receive said sequence of endogenous random current pulses S1 and to determine a random bit sequence S2 to be provided to an end user EU, on the basis of said sequence of endogenous random current pulses S1 received from said at least one Silicon Photo-Multiplier sensor 201.

Examples of end user EU are cryptographic key generation devices, electronics gambling machines, network random coding systems.

According to an embodiment, shown in FIG. 3, the data processing unit 202 of the device 200 comprises a signal conditioning module 203 configured to receive said sequence of endogenous random current pulses S1.

The signal conditioning module 203 of the device 200 is configured to determine a logical stop signal STP for each current pulse of said sequence of endogenous random current pulses S1 received from said at least one Silicon Photo-Multiplier sensor 201.

The signal conditioning module 203 can be considered as an Analog Front-End (AFE) module.

According to the embodiment of FIG. 3, the data processing unit 202 of the device 200 further comprises a Time to digital converter module 204 configured to receive a logical start signal STR and each logical stop signal STP determined by the signal conditioning module 203.

The Time to digital converter module 204 is further configured to measure the time interval between a time of arrival of each logical stop signal STP and the time of arrival of the logical starting signal STR.

According to the embodiment of FIG. 3, the data processing unit 202 of the device 200 further comprises a control module 205 configured to provide the Time to digital converter module 204 with the logical start signal STR at the device 200 power-on.

According to the present embodiment, the control module 205 is further configured to process each time interval measured by the Time to digital converter module 204 and to generate the random bit sequence S2 to be provided to the end user EU, on the basis of each processed time interval.

According to an embodiment, the control module 205 is a System-On-Chip (SoC) module.

The control module 205 is configured to communicate to the other module of the device 200 through a Serial Peripheral Interface (SPI) and/or Inter-Integrated Circuit protocols ($I^2C$ lines).

According to an embodiment, shown in FIG. 3, the device 200 further comprises a High Voltage power supply module 206 configured to provide High Voltage power supply to the at least one Silicon Photo-Multiplier sensor 201.

The High Voltage power supply module 206 is further configured to control the dependence of the operational electric voltage and the excess bias of the at least one Silicon Photo-Multiplier sensor 201 with respect to the breakdown voltage value.

According to an embodiment, in combination with the previous one, the control module 205 is configured to control the at least one Silicon Photo-Multiplier sensor 201 via the High Voltage power supply module 206.

According to this embodiment, the control module 205 is further configured to control also the signal conditioning module 203 and the Time to digital converter module 204.

As mentioned above, the signal conditioning module 203 can be considered as an Analog Front-End (AFE) module.

In this regard, according to an embodiment, shown in FIG. 4, the signal conditioning module 203 comprises a current-to-voltage conversion module 401 configured to convert each current pulse of the sequence of endogenous random current pulses S1 into a correspondent voltage pulse.

An example of current-to-voltage conversion module 401 is a transimpedance amplifier.

According to this embodiment, shown in FIG. 4, the signal conditioning module 203 further comprises a level adapter module 402 configured to adapt the level of each voltage pulse.

The level adapter module 402 is downstream the current-to-voltage conversion module 401.

An example of level adapter module 402 is a module for off-setting a signal.

According to this embodiment, the signal conditioning module 203 further comprises a comparator module 403 configured to compare each voltage pulse with a tunable threshold.

The comparator module 403 is further configured to provide a logical voltage level output whenever the threshold is exceeded.

Indeed, according to this embodiment, the comparator module 403 is further configured to generate each logical stop signal STP on the basis of the result of the performed comparison.

The comparator module 403 can be based on different standard, e.g. standard TTL, standard NIM, standard CMOS, standard ECL and so on.

The comparator module 403 is downstream the level adapter module 402.

In this embodiment, the device 200 further comprises a Digital-To-Analog converter module 404 operatively connected to the comparator module 403 and configured to provide the comparator module 403 with the tunable threshold.

The Digital-To-Analog converter module 404 is controlled by the control module 205.

According to a further embodiment, shown in FIG. 4, in combination with any of the embodiment previously described, the device 200 further comprises a Peltier cell 405 operatively associated to the at least one Silicon Photo-Multiplier sensor 201.

The Peltier cell 405, based on temperature control, is configured to control the temperature variations of the at least one Silicon Photo-Multiplier sensor 201.

In this regard, whether randomness is not affected by temperature variations, the study of the current pulse frequency against temperature can be of interest for end users.

According to an embodiment, the Peltier cell 405 is embedded in a package integrating also the at least one Silicon Photo-Multiplier sensor 201.

According to an embodiment, shown in FIG. 4, the device 200 comprise a buck DC-to-DC converter module 406 operatively connected to the Peltier cell 405.

The buck DC-to-DC converter module 406 is configured to bias the Peltier cell 405.

The buck DC-to-DC converter module 406 is controlled by the control module 205.

According to a further embodiment, shown in FIG. 4, in combination of any of the embodiment previously described, the control module 205 comprises an output interface 407 configured to provide the end user EU with the random bit sequence S2 to be provided to an end user EU.

Examples of output interface 407 can be communication port of Ethernet type, USB type or Wi-Fi type.

According to the different embodiments, the device integration can be achieved in an efficient, highly customizable and cost-effective way.

Indeed, according to an embodiment, not shown in the Figures, in combination with any embodiment previously described, the at least one Silicon Photo-Multiplier sensor 201 can be housed in a Transistor Outline (TO) package, embedding also the Peltier Cell 405 and making easy at the same time to mask the at least one Silicon Photo-Multiplier sensor 201 from external light.

In addition, according to a further embodiment, not shown in the Figures, in combination with any embodiment previously described, it should be noted that the measurement of time can be performed through different architectures.

As an example, specific chip can be used, offering the possibility at sub/dollar cost/unit to measure time from two independent sources with a resolution at the level of 55 ps, time digitisation over 24 bits and the possibility to record up to five (5) logical stop signals for every cycle.

However, it should be noted that in terms of power consumption this embodiment is expected to require at least a few Watt and typical multi-tier structures over typical area of 25 to 100 $cm^2$ shall be envisaged.

As long as size and power consumption matter, a further embodiment, not shown in the figure, in combination with any embodiment previously described, can be considered.

According to this embodiment, the Time to digital converter module 204 can be implemented in a Field Programmable Gate Array (FPGA) chip, where a number of architectures are proven to be reliable.

According to this embodiment, the at least one Silicon Photo-Multiplier sensor 201 is not temperature controlled and it can be mounted on a board in SMT (Surface Mount Technology) packaging but a temperature feedback for the overvoltage stabilization can be provided.

Such an embodiment may advantageously fit an area not exceeding a few $cm^2$ for a power consumption in the few hundreds of mW range.

According to a further embodiment, not shown in the Figures, in combination of any embodiment previously described, a low power miniaturized device can be arranged on an Application Specific Integrated Circuit (ASIC), profiting from the advances in vertical integration of microelectronics devices and the design of Time to Digital converter module for LIDAR (Light Detection and Ranging), High Energy Physics and Medical applications.

According to this embodiment, the device 200 can comprises additional Silicon Photo-Multiplier sensors, other than the at least one Silicon Photo-Multiplier sensor 201.

Figure 5:
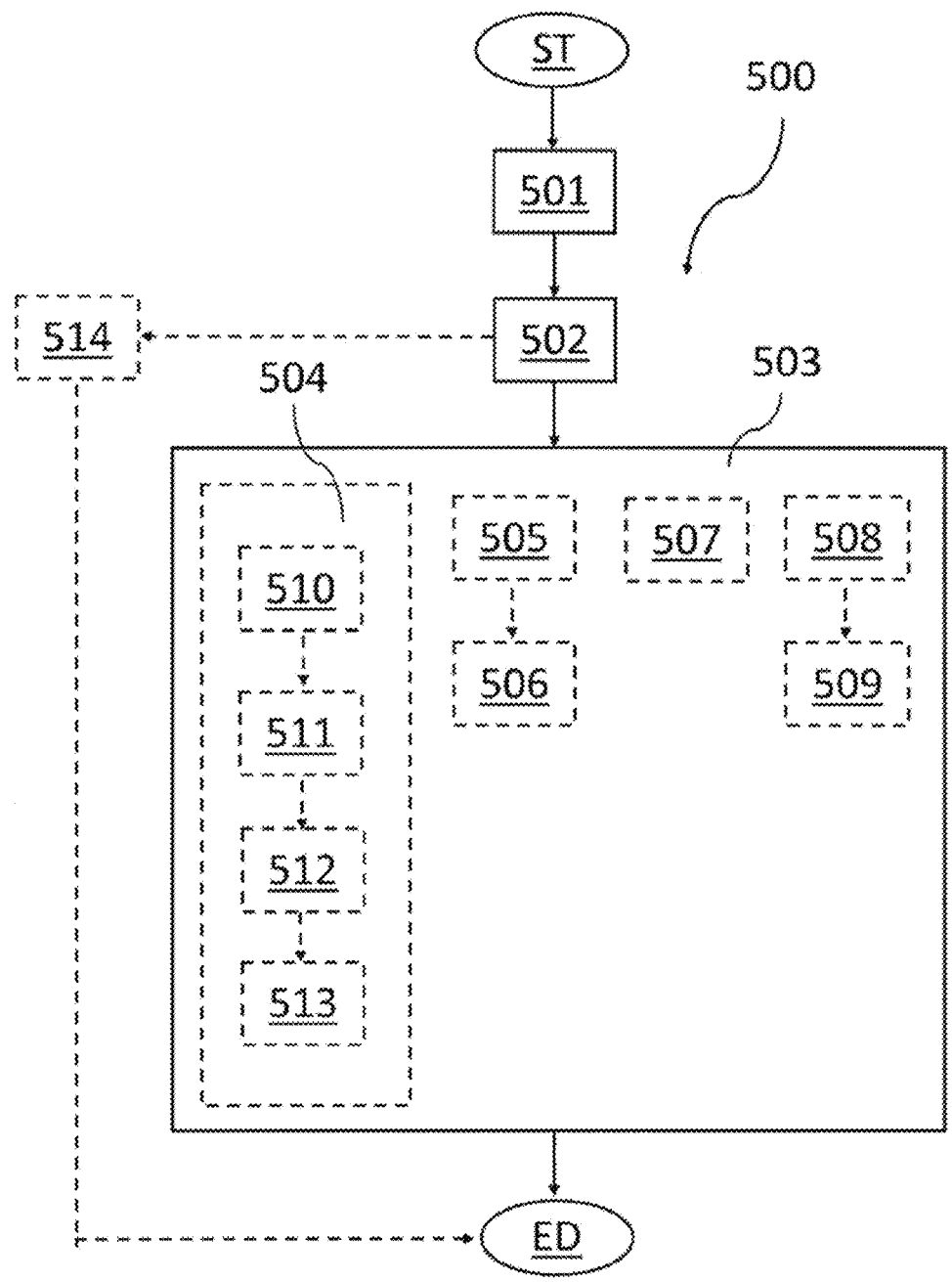

With reference also to FIG. 5, a method 500 for generating random bit sequences, according to the present invention, is now described.

The method 500 comprises a symbolic step of starting ST.

The method 500 further comprises a step generating 501, by at least one Silicon Photo-Multiplier sensor 201, a sequence of endogenous random current pulses S1 as a result of an impact ionization driven self-amplification of thermally generated charge carriers to which the at least one Silicon Photo-Multiplier sensor 201 is subject.

The method 500 further comprises a step of receiving 502, by a data processing unit 202 of a device 200 for generating random bit sequences, said sequence of endogenous random current pulses S1.

The method 500 further comprises a step of determining 503, by the data processing unit 202, a random bit sequence S2 to be provided to an end user EU, on the basis of said sequence of endogenous random current pulses S1 received from said at least one Silicon Photo-Multiplier sensor 201.

The method 500 ends with a symbolic step of ending ED.

According to an embodiment, shown in dotted lines in FIG. 5, the step of determining 503 further comprises a step of determining 504, by a signaling conditioning module 203 of the data processing unit 202, a logical stop signal STP for each current pulse of said sequence of endogenous random current pulses S1 received from said at least one Silicon Photo-Multiplier sensor 201.

According to an embodiment, shown in dotted lines in FIG. 5, in combination with the previous embodiment, the step of determining 503 further comprises steps of:
  receiving 505, by a Time to digital converter module 204 of the data processing unit 202, a logical start signal STR and each logical stop signal STP determined by the signal conditioning module 203;
  measuring 506, by the Time to digital converter module 204 of the data processing unit 202, the time interval between a time of arrival of each logical stop signal STP and the time of arrival of the logical starting signal STR.

According to an embodiment, shown in dotted lines in FIG. 5, in combination with the previous embodiment, the step of determining 503 further comprises a step of providing 507, by a control module 205 of the data processing unit 202, the logical start signal STR to the Time to digital converter module 204 of the data processing unit 202 at the device 200 power-on.

According to an embodiment, shown in dotted lines in FIG. 5, in combination with the previous embodiment, the step of determining 503 further comprises steps of:
  processing 508, by the control module 205, each time interval measured by the Time to digital converter module 204; and
  generating 509, by the control module 205, the random bit sequence S2 to be provided to the end user EU, on the basis of each processed time interval.

According to an embodiment, shown in dotted lines in FIG. 5, the step of determining 504 comprises steps of:
  converting 510, by a current-to-voltage conversion module 401 of the signal conditioning module 203, each current pulse of the sequence of endogenous random current pulses S1 into a correspondent voltage pulse;
  adapting 511, by a level adapter module 402 of the signal conditioning module 203, the level of each voltage pulse;
  comparing 512, by a comparator module 403 of the signal conditioning module 203, each voltage pulse with a tunable threshold provided by a Digital-To-Analog converter module 404 of the device 200;
  generating 513, by the comparator module 403 of the signal conditioning module 203, each logical stop signal STP on the basis of the result of the performed comparison.

According to an embodiment, shown in dotted lines in FIG. 5, in combination with any embodiment previously described, the method 500 further comprises a step of controlling 514, by a Peltier cell 405 of the device 200, operatively associated to the at least one Silicon Photo-Multiplier sensor 201, the temperature variations of the at least one Silicon Photo-Multiplier sensor 201.

The device and the method according to the present invention have several advantages, i.e.:
  a) Minimum complexity due to the endogenous nature of the random pulses of quantum nature;
  b) Low power consumption;
  c) Robustness against temperature and power supply variations;
  d) Low cost due to the silicon technology;
  e) High efficiency (bit rate/pulse) (no post-processing with whitening algorithms required);
  f) Cost effectiveness;
  g) Reasonably high bit rate (in excess of 1 Mbps/mm2 sensor);
  h) Scalability.

Those skilled in the art may make changes and adaptations to the above-described embodiments of the device and method for generating random bit sequences or can replace elements with others which are functionally equivalent in order to meet contingent needs without departing from the scope of the following claims. Each of the features described as belonging to one possible embodiment may be implemented independently of the other embodiments described.

What is claimed is:

1. A device for generating random bit sequences, the device comprising:
  at least one Silicon Photo-Multiplier sensor configured to generate a sequence of endogenous random current pulses as a result of an impact ionization driven self-amplification of thermally generated charge carriers generated endogenously by direct or trap assisted band gap tunneling, without relying on an exogenous source of pulses external to said at least one Silicon Photo-Multiplier sensor; and
  a data processing unit configured to receive said sequence of endogenous random current pulses and to determine a random bit sequence to be provided to an end user, on the basis of said sequence of endogenous random current pulses received from said at least one Silicon Photo-Multiplier sensor.

2. The device of claim 1, wherein said data processing unit comprises a signal conditioning module configured to receive said sequence of endogenous random current pulses, said signal conditioning module being configured to determine a logical stop signal for each pulse of said sequence of endogenous random current pulses received from said at least one Silicon Photo-Multiplier sensor.

3. The device of claim 2, wherein said data processing unit further comprises a Time to digital converter module configured to receive a logical start signal and each logical stop signal determined by the signal conditioning module, said Time to digital converter module being further configured to measure a time interval between a time of arrival of each logical stop signal and the time of arrival of the logical starting signal.

4. The device of claim 3, wherein the data processing unit comprises a control module configured to send to the Time to digital converter module said logical start signal at the device power-on, said control module being further configured to process each time interval measured by the Time to digital converter module and to generate the random bit sequence to be provided to the end user, on the basis of each processed time interval.

5. The device of claim 4, further comprising a High Voltage power supply module configured to provide High Voltage power supply to the at least one Silicon Photo- Multiplier sensor, the High Voltage power supply module being further configured to control dependence of an operational electric voltage and an excess bias of the at least one Silicon Photo-Multiplier sensor with respect to a breakdown voltage value.

6. The device of claim 4, wherein the control module is configured to control the at least one Silicon Photo-Multiplier sensor via the High Voltage power supply module, the control module being further configured to control also the signal conditioning module and the Time to digital converter module.

7. The device of claim 4, wherein the control module comprises an output interface configured to provide the end user with the random bit sequence.

8. The device claim 2, wherein the signal conditioning module comprises:
   a current to voltage conversion module configured to convert each current pulse of the sequence of endogenous random current pulses into a correspondent voltage pulse;
   a level adapter module configured to adapt the level of each voltage pulse; and
   a comparator module configured to compare each voltage pulse with a tunable threshold provided by a Digital-To-Analog converter module operatively connected to the comparator module, the comparator module being further configured to generate each logical stop signal on the basis of a result of the performed comparison.

9. The device claim 2, further comprising a Peltier cell operatively associated to the at least one Silicon Photo-Multiplier sensor, said Peltier cell being based on temperature control and configured to control temperature variations of the at least one Silicon Photo-Multiplier sensor.

10. The device of claim 9, wherein said Peltier cell is embedded in a package integrating also the at least one Silicon Photo-Multiplier sensor.

11. The device of claim 9, further comprising a buck DC-to-DC converter module operatively connected to the Peltier cell, the buck DC-to-DC converter module being configured to bias the Peltier cell, the buck DC-to-DC converter module being controlled by the control module.

12. A method for generating random bit sequences, the method comprising:
   generating, by at least one Silicon Photo-Multiplier sensor, a sequence of endogenous random current pulses as a result of an impact ionization driven self-amplification of thermally generated charge carriers to which the at least one Silicon Photo-Multiplier sensor is subject;
   receiving, by a data processing unit of a device for generating random bit sequences, said sequence of endogenous random current pulses; and
   determining, by the data processing unit, a random bit sequence to be provided to an end user, on the basis of said sequence of endogenous random current pulses received from said at least one Silicon Photo-Multiplier sensor.

13. The method of claim 12, wherein the step of determining, by the data processing unit, a random bit sequence to be provided to an end user, on the basis of said sequence of endogenous random current pulses received from said at least one Silicon Photo-Multiplier sensor, further comprises determining, by a signal conditioning module of the data processing unit, a logical stop signal for each current pulse of said sequence of endogenous random current pulses received from said at least one Silicon Photo-Multiplier sensor.

14. The method of claim 13, wherein the step of determining, by the data processing unit, a random bit sequence to be provided to an end user, on the basis of said sequence of endogenous random current pulses received from said at least one Silicon Photo-Multiplier sensor, further comprises:
   receiving, by a Time to digital converter module of the data processing unit, a logical start signal and each logical stop signal determined by the signal conditioning module; and
   measuring, by the Time to digital converter module of the data processing unit, a time interval between a time of arrival of each logical stop signal and the time of arrival of the logical start signal.

15. The method of claim 14, wherein the step of determining, by the data processing unit, a random bit sequence to be provided to an end user, on the basis of said sequence of endogenous random current pulses received from said at least one Silicon Photo-Multiplier sensor, further comprises providing, by a control module of the data processing unit, the logical start signal to the Time to digital converter module of the data processing unit at the device power-on.

16. The method of claim 15, wherein the step of determining, by the data processing unit, a random bit sequence to be provided to an end user, on the basis of said sequence of endogenous random current pulses received from said at least one Silicon Photo-Multiplier sensor, further comprises:
   processing, by the control module, each time interval measured by the Time to digital converter module; and
   generating, by the control module, the random bit sequence to be provided to the end user, on the basis of each processed time interval.

17. The method of claim 13, wherein the step of determining, by a signal conditioning module of the data processing unit, a logical stop signal for each current pulse of said sequence of endogenous random current pulses received from said at least one Silicon Photo-Multiplier sensor, further comprises:
   converting, by a current-to-voltage conversion module of the signal conditioning module, each current pulse of the sequence of endogenous random current pulses into a correspondent voltage pulse;
   adapting, by a level adapter module of the signal conditioning module, the level of each voltage pulse;
   comparing, by a comparator module of the signal conditioning module, each voltage pulse with a tunable threshold provided by a Digital-To-Analog converter module of the device; and
   generating, by the comparator module of the signal conditioning module, each logical stop signal on the basis of a result of the performed comparison.

18. The method of claim 12, further comprising controlling, by a Peltier cell of the device, operatively associated to the at least one Silicon Photo-Multiplier sensor, temperature variations of the at least one Silicon Photo-Multiplier sensor.

\* \* \* \* \*